United States Patent [19]

Schael

[11] E Re. 31,029

[45] Reissued Sep. 14, 1982

[54] DIALYZER CARTRIDGE AND METHOD FOR ITS MANUFACTURE

[75] Inventor: Wilfried Schael, Bad Homburg, Fed. Rep. of Germany

[73] Assignee: Dr. Eduard Fresenius Chemisch-pharmazeutische Industrie KG, Apparatebau KG, Bad Homburg, Fed. Rep. of Germany

[21] Appl. No.: 212,081

[22] Filed: Dec. 1, 1980

Related U.S. Patent Documents

Reissue of:

[64] Patent No.: 4,141,836
Issued: Feb. 27, 1979
Appl. No.: 724,935
Filed: Sep. 20, 1976

[30] Foreign Application Priority Data

Aug. 24, 1975 [DE] Fed. Rep. of Germany ..... 2542438

[51] Int. Cl.[3] ..... B01D 31/00
[52] U.S. Cl. ..... 210/321.2; 210/456
[58] Field of Search ..... 210/321.1, 321.2, 321.3, 210/321.4, 321.5, 433.1, 456, 646

[56] References Cited

U.S. PATENT DOCUMENTS

| | | | |
|---|---|---|---|
| 3,228,876 | 1/1966 | Mahon | 210/646 |
| 3,422,008 | 1/1969 | McLain | 210/646 |
| 3,852,198 | 12/1974 | Murakami | 210/456 |
| 3,884,814 | 5/1975 | Vogt et al. | 210/321.1 |
| 3,953,334 | 4/1976 | Brun | 210/321.1 |

FOREIGN PATENT DOCUMENTS

| | | |
|---|---|---|
| 1566589 | 10/1970 | Fed. Rep. of Germany . |
| 2300312 | 7/1973 | Fed. Rep. of Germany . |
| 2231421 | 12/1974 | France . |

*Primary Examiner*—John Adee
*Attorney, Agent, or Firm*—W. G. Fasse; D. H. Kane, Jr.

[57] ABSTRACT

A dialyzer with a housing includes a pair of inflow and outflow pipes for blood and dialysis solution, and a tubular ring body formed from a plurality of hollow filaments joined to one another at their ends and positioned in the housing such that one pair of the pipes is in communicating relationship with open ends of the hollow filaments and the other pair of the pipes communicates with the interstices between adjacent filament forming said tubular ring body. The invention also provides a dialyzer cartridge and a method of manufacturing such cartridge.

15 Claims, 3 Drawing Figures

DIALYZER CARTRIDGE AND METHOD FOR ITS MANUFACTURE

Matter enclosed in heavy brackets [ ] appears in the original patent but forms no part of this reissue specification; matter printed in italics indicates the additions made by reissue.

BACKGROUND OF THE INVENTION

The invention relates to a dialyser, in particular for haemodialysis, which comprises a housing with inflow and outflow pipes for blood and dialysis solution and open hollow filaments arranged in the housing and joined to one another at their ends, as well as to a dialyser cartridge, as well as a method for the manufacture of such a dialyser.

Haemodialysis requires a membrane of large surface area, some 1-1.5 $m^2$ in size and 10-20 $\mu m$ thick, of a material capable of acting as a dialytic permeable membrane, for example, cellulose acetate, polyacrylonitrile and similar materials are capable to act as separating layer between the blood and the suitably composed dialysis solution. The membrane is relatively easily permeable for water and low molecular weight constituents of the blood, including also substances contained in urine. High molecular weight and corpuscular constituents are however almost completely retained.

Under the term dialysers for haemodialysis can be recognised spool or coil dialysers, plate dialysers and also capillary or hollow filament dialysers, in which the membrane is formed from a large number (e.g. 10,000) of hollow filaments having a diameter of about 150 $\mu m$. In the hitherto usual arrangement the hollow filaments are collected into a loose bundle of parallel filaments and arranged in a cylindrical housing. The ends of the bundle of hollow filaments are sealed off and packed against the housing. The inflow and outflow of the blood stream is effected by connecting pieces screwed onto the ends of the housing. The dialysis solution flows, in countercurrent, along the outside of the capillaries or hollow filaments, inflow and outflow occurring via lateral connections in the vicinity of the ends of the housing.

In designing a hollow filament dialyser great efforts are made to achieve as great an effectiveness as possible, i.e. a flow distribution as uniform as possible is necessary in order to fully utilize the membrane surface. High flow velocities are also desirable since this reduces the diffusion resistance in the blood and dialysis solution. Furthermore, the blood filling volume should be as small as possible and the blood flow resistance should be low. A hollow filament dialyser in principle provides the necessary prerequisites in order to meet these requirements.

OBJECTS OF THE INVENTION

In view of the above, it is the aim of the invention to achieve the following objects, singly or in combination:

- to provide a dialyser of the afore-mentioned type which optimally meets the above requirements and which furthermore can be manufactured in an advantageous manner;
- to provide a dialyser in which the hollow filaments are in the form of a ring with the inflow and outflow of the medium flowing in the interstices from the middle thereof;

- to provide a dialyser cartridge that is replaceable within a housing, having inflow and outflow pipes associated therewith especially for blood dialysis; and
- to provide a method for manufacturing of a dialyser cartridge and/or housing.

SUMMARY OF THE INVENTION

In order to solve this problem the invention provides a dialyser in which the hollow filaments are arranged in the form of a ring and the inflow and outflow of the medium flowing in the interstices between the hollow filament pieces takes place from the middle. The flow conditions are thereby favorably influenced, and in addition this also provides the possibility of manufacturing the unit consisting of hollow filaments in a particularly convenient manner.

A further embodiment of the invention accordingly proposes that the hollow filaments are wound on the core and that the ends of the wound hollow filament body are then impregnated with a cast resin and the end regions are cut off, after solidification, in such a way that the front surfaces of the individual hollow filament pieces are open.

In this connection, the hollow filaments can be wound inclined or parallel to the axis of the core, winding being carried out with devices known per se.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
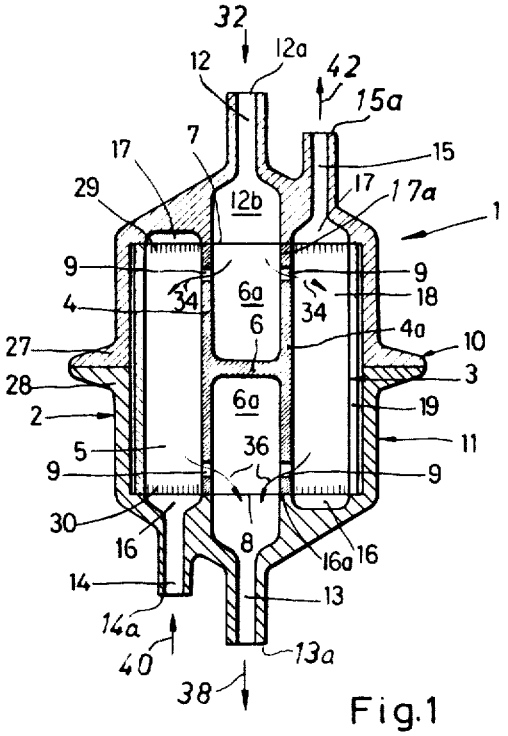
FIG. 1 is a sectional view through a dialyser according to the invention.

Referring now to the drawings dialyser 1 according to the invention, is illustrated in FIG. 1, and consists of a two-part housing 2 in which a hollow filament body or cartridge 3 is located. The hollow filament body consists of a core 4, on which a body or hollow filament 5 consists of cellulose acetate or polyacrylonitrile is wound in accordance with FIG. 2 or 3.

The core 4 may be tubular having an outer wall or surface 4a and an inner wall or surface 4b with at least one radially extending separating wall 6 there between, as well as several passage openings 9 distributed on the periphery between the outer wall 4a and the inner wall 4b, adjacent the two ends 7 and 8 of the core 4. The wall 6 separates or divides the core 4 into a pair of chambers 6a that are sealed from each other by the separating wall 6. The two halves or sections 10 and 11 of the housing 2 each have together with the tubular shaped core 4 an aligned inflow conduit or pipe 12 and outflow conduit or pipe 13. The pair or set of pipes 12 and 13 may be in axial alignment with each other and having a terminal end 12a and 13a respectively. Each pipe 12 and 13 may extend into an enlarged passage 12b and 13b respectively, which are in alignment with the chambers 6a to provide a proper flow of fluid therethrough. Each half 10 and 11 further has another pair or set of pipes consisting of an inflow pipe 14 and outflow pipe 15 which open out into a guide channel 16 and 17 in the interior of the halves 10 and 11 of the housing 2. The width of the two channels 16 and 17 preferably corresponds to the layer of hollow filament pieces 18 arranged in the form of a ring on the core 4. The inflow pipe 14 has an outer end 14a, and the outflow pipe 15 has an outer end 15a. The inflow pipe 14 and outflow pipe 15 are provided in non-aligned relationship with respect to each other to provide the necessary flow length for the dialysis fluid.

Like the cylindrical core 4, the hollow filament body 3 also has a circular cross-section. A jacket 19 is arranged on the circumference of the hollow filament body 3, which not only holds together the external hollow filament pieces 18 but also serves for sealing purposes. The jacket 19 may extend the same axial length as the core 4 and coincide with the ends 7 and 8 thereof. As illustrated in FIG. 1 the guide channels 16 and 17 each include an inner edge or wall 16a and 17a that engages the ends 7 and 8 respectively, of the core 4 as well as each end of jacket 19. The core 4 and jacket 19 may be in co-axial alignment with each other.

Figure 2:
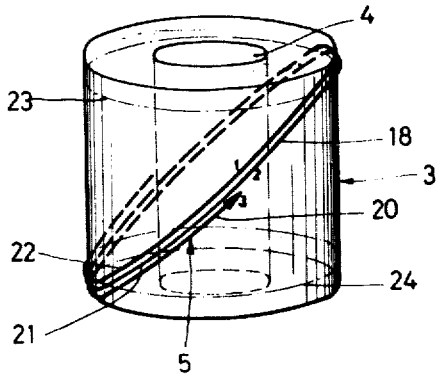
FIG. 2 is a perspective view of a hollow filament body with the hollow filament windings inclined to the core axis.
Figure 3:
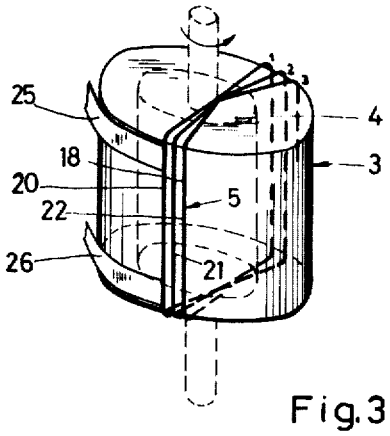
FIG. 3 is a perspective view of a hollow filament body with windings parallel to the core axis.

The manufacture of the hollow filament body is carried out in accordance with FIGS. 2 and 3 in such a way that the hollow filament 5 is wound on the core 4 with an arbitrary number of windings 20, 21 and 22, the winding being performed so that the windings are either inclined or parallel to the longitudinal axis or plane of the core 4. During the winding procedure the hollow filament 5 is led back and forth so that after a certain angle of rotation of the winding device carrying the core 4, the said filament moves from one edge to the other edge. A compact or a lightly wound hollow filament body is thus obtained depending on the angle of inclination.

The ends of the hollow filament body 3 wound in this manner are then impregnated with a cast resin so that all interstices are filled and the windings of the hollow filaments 5 are firmly embedded. In a following operation the outermost end regions of the hollow filament body 3 impregnated by the cast resin are cut off along the dotted lines 23 and 24 in FIG. 2, with the result that hollow filament pieces 18 roughly corresponding to the length of the core 4 are formed, which are open and freely accessible at their front faces for a flow of fluid through the hollow filament pieces 18.

In the case of the hollow filament body 3 shown in FIG. 3, the hollow filament 5 is wound over the circumference and the front sides of the core 4 so that the hollow filament pieces 18 lie on the circumference of the core approximately parallel to the axis thereof.

During the winding the core 4 is slowly rotated about its longitudinal axis, which is at right angles to the winding axis. The angular displacement depends on the relationship between winding rate and the rotational velocity of the hollow filament body. The required distance or spacing between the hollow filament pieces 18 can be achieved by the simultaneous applying or winding of foil strips 25 and 26, which are wound in the direction of the circumference as can be seen from FIG. 3.

When the hollow filament body 3 has been impregnated with cast resin, hardened, and then cut at its edge or end regions, after the winding procedure, the jacket 19 is applied, following which the hollow filament body 3 can be inserted into the housing 2 consisting of practically equal sections of halves 10 and 11. After insertion, the two halves 10 and 11 or the housing are securely connected to one another in their flange region 27 and 28 in a conventional manner.

The dialysis solution enters the dialyser through the centrally arranged inflow pipe 12 in the direction of arrow 32, and first of all passes into one half, or chamber 6a, of the tube-shaped core 4, from which it then flows through the passage openings 9 in the direction of arrows 34, and splits up in the interstices between the hollow filament pieces 18. After the dialysis solution has flowed through the hollow filament body 3, it reenters the core 4 through the passage opening 9, in the direction of arrows 36, at the other end thereof into chamber 6a and then flows directly to the outflow pipe 13, in the direction of arrow 38.

The blood flows through the dialyser 1 in the opposite direction. It enters through the inflow pipe 14, in the direction of arrow 40 which opens out into the guide channel 16. From there the blood is distributed through the hollow filament pieces 18 from which it flows into the guide channel 17 in the other half 10 of the housing, which channel 17 collects the blood and passes it to the outflow pipe 15 in the direction of arrow 42.

FIG. 1 clearly illustrates the sealing function of the jacket 19, against the walls 16a and 17a which prevents any bypass for the dialysis solution parallel to the hollow filament pieces 18 and into the chamber 6a, or passages 12b or 13b.

A further prerequisite for satisfactory operation is that the end regions 29 and 30 of the hollow filament body 3, which are sealed with a cast resin, are absolutely tight and impermeable since otherwise dialysis solution can pass into the two guide channels 16 and 17. The position of the passage openings 9 is chosen so that they are immediately adjacent to the end regions 29 and 30 impregnated with cast resin. In this manner the spacing between each hollow filament 18 is sealed preventing the escape from each end region 29 and 30, and yet permitting the flow of fluid through the individual filament pieces 18.

The dialysis solution or medium is distributed very rapidly over the whole cross-section of the circularly arranged hollow filament pieces 18 by virtue of the feed of dialysis solution from the centrally arranged core 4 into the interstices between the hollow filament pieces 18 which are in communicating relationship with inflow and outflow pipes 12 and 13. The transition zone from a uniformly "flushed" cross-section to a "non-flushed" cross-section is very short at the inflow and outflow, which is accompanied by an increase in the exchange efficiency on account of the better utilization of the incorporated hollow filament surface. This can be fully exploited by incorporating a correspondingly smaller amount of hollow filament material in the dialyser, any increase in efficiency being relinquished, and in addition the flow resistance on the blood side can be markedly reduced if the number of hollow filaments is increased and their length is reduced, the total surface area remaining the same. This provides one of the conditions in haemodialysis for driving the blood circulation outside the body without the use of blood pumps, the natural arterial-venous pressure drop being utilized. The invention is not limited to the examples of the embodiments illustrated in the figures, and indeed alterations can be carried out without departing from the basic ideas of the invention. Thus, for example, it is also possible to provide appropriate separating walls instead of the separating wall 6 immediately adjacent to the passage openings 9, so that the dialysis solution passes into the interior of the hollow filament body 3 via the shortest pathway. Furthermore, it may also be convenient if the manufacturing procedure described above is altered and the jacket 19 is applied before the ends of the hollow fiber body are impregnated with cast resin.

Although the invention has been described with reference to specific example embodiments, it is to be understood, that it is intended to cover all modifications and equivalents within the scope of the appended claims.

What is claimed is:

1. A dialyser comprising housing means having a longitudinal axis and a central plane of symmetry extending perpendicularly to said longitudinal axis, said housing means including first and second housing members each of which has a substantially mirror-symmetrical shape relative to the respective other housing member and relative to said plane of symmetry, each housing member having an open end portion facing said plane of symmetry and means for connecting the open end portions of the two housing members to each other, each housing member further comprising a port section opposite said open end portion, each port section comprising first central port means arranged substantially concentrically relative to said longitudinal axis and a central cavity smoothly merging into said central port means and open opposite the respective first port means, each port section further comprising second port means located radially outwardly of said first, central port means and a ring cavity surrounding said central cavity and smoothly merging into the respective second port means, said ring cavity also being open toward said open end portion of the respective housing member, dialyser cartridge means in said housing means, said dialyser cartridge means comprising hollow tubular core means with a wall therein dividing said hollow tubular core means into two cavities extending coaxially relative to said longitudinal axis and substantually in register with the respective one of said central cavities in the corresponding port section, hollow filaments wound on said hollow, tubular core means, said hollow filaments having open ends, means bonding said open ends of said filaments to each other so as to close the spaces between the filaments adjacent the open ends and to form a ring body of filaments directly around said hollow tubular core means, said ring body of filaments having interstices between adjacent filaments intermediate said bonding means, radially extending holes in said hollow, tubular core means to provide for a smooth flow communication between said first port means through said central cavities, through said radially extending holes, and through said interstices between adjacent filaments, said open ends of said filament ring body extending substantially in register with the respective one of said ring cavities to provide for a further smooth flow communication between said second port means through said ring cavities and longitudinally through said hollow filaments.

2. The dialyser of claim 1, further comprising jacket means surrounding said filaments on said tubular core means.

3. The dialyser of claim 1, wherein said hollow filaments are directly wound on said hollow, tubular core to form winding sections having a curved shape and extending in planes slanting at an angle relative to said longitudinal central axis, said angle being such that said open ends of said filaments face the respective ring cavity (FIG. 2).

4. The dialyser of claim 1, wherein said hollow filaments are directly wound on said hollow tubular core to form winding sections having a substantially rectangular shape initially having axially and radially extending portions, the latter having been cut off so that said open ends of said filaments face the respective ring cavity, (FIG. 3).

5. The dialyser of claim 1, wherein said radially extending holes in said hollow, tubular core means are located near the outer ends of said hollow, tubular core means away from said wall in said hollow tubular core means whereby flow of liquid extends substantially radially adjacent said bonding means into and out of said interstices and substantially axially through said interstices intermediate said holes in said hollow tubular core means.

6. The dialyser of claim 5, wherein said wall is located substantially in said plane of symmetry.

7. The dialyser of claim 1, further comprising shoulder means in said port sections, said shoulder means contacting said hollow, tubular core means in a sealing manner.

*8. A dialyzer comprising housing means having a longitudinal axis and a central plane of symmetry extending perpendicularly to said longitudinal axis, said housing means including first and second housing members each of which has a substantially symmetrical shape relative to the respective other housing member and relative to said plane of symmetry, each housing member having an open end portion facing said plane of symmetry and means for connecting the open end portions of the two housing members, each housing member further comprising a port section opposite said open end portion, each port section comprising first central port means arranged substantially concentrically relative to said longitudinal axis and a central cavity coupled into said central port means, each port section further comprising second port means located radially outwardly of said first, central port means and a ring cavity surrounding said central cavity and smoothly merging into the respective second port means, said ring cavity being open toward said open end portion of the respective housing member, hollow filament means in said housing means, core means extending coaxially relative to said longitudinal axis and between the respective central cavities in the corresponding port sections, said hollow filament means being held on said core means, said hollow filament means having open ends, means bonding said open ends of said hollow filaments to one another so as to close the spaces between the filaments adjacent the open ends and to form a ring body of filaments around said core means, said ring body of filaments having interstices between adjacent filaments intermediate said bonding means, radially directed passage openings from the central cavities at the ends of the core means to provide a continuous communication between said first port means through said central cavities, through said radially directed passage openings and through said interstices between adjacent filaments, said core blocking any flow directly between said central cavities, said open ends of said filament ring body extending substantially in register with the respective one of said ring cavities to provide for continuous smooth flow communication between said second port means through said ring cavities and longitudinally through said hollow filaments.*

*9. The dialyzer of claim 8, wherein said means for connecting the open end portions of the two housing members comprise sealing jacket means (19) surrounding said fiber bundle means.*

*10. The dialyzer of claim 8, wherein said first or second housing members comprise flanged enclosure portions enclosing said dialyzer and abutting against each other in connecting relationship.*

*11. A dialyzer comprising elongated housing means having a longitudinal axis, said housing means including outer jacket sealing means extending coaxially to said longitudinal axis, central core means extending coaxially within the outer jacket sealing means, said outer jacket sealing means and central core means defining therebetween an annular space extending along the longitudinal axis of the housing, first and second housing end members engaging the coaxial outer jacket sealing means and central core means at each end of the housing means; hollow filament means comprising hollow filaments positioned about said central core means and substantially occupying the annular space between the outer jacket sealing means and the central core means, said hollow filaments having open ends facing the respective end member at both ends of said housing means; means bonding the open ends of said filaments to each other to close spaces between the filaments at each end of said housing means, thereby forming substantially a ring body of open ended filaments around the core means, whereby the open filament ends face the housing end members; said housing end members defining at each end of the housing means a ring cavity facing the open filament ends, said end members comprising peripheral port means smoothly merging into the ring cavity means for continuous smooth flow communication of fluid from said peripheral port means through said ring cavity and into the hollow filaments of the bundle through the open filament ends; said hollow filament means having interstices between adjacent filaments extending substantially the entire length of the filament bundle intermediate the bonding means at each end; said first and second housing end members further defining in combination with said central core means, central cavity means at each end of said housing means, said end members comprising central port means opening into said central cavity means; said central core means comprising flow blocking means intermediate the ends thereof to prevent passage of fluid through said central core means from one end to the other; said central core means further comprising opening means distributed around the periphery of said core means at each end of the core means for directing fluid from the central cavity radially outwardly into the interstices between said filaments at one end of the filaments and for receiving fluid from the interstices at the other end of the filaments; said outer jacket sealing means and central core means thereby confining the flow of fluid, received through the central port means and distributed radially into the interstices of the filaments, axially along the interstices through substantially the entire length of the filaments between the bonding means.*

*12. The dialyzer of claim 11, wherein said outer jacket sealing means comprises elongated cylindrical wall means and wherein said central core means comprises coaxial cylindrical core means.*

*13. The dialyzer of claim 11, wherein said central core means comprises a tubular core and wherein said separating means for sealing the tubular core means to prevent passage of fluid through the core comprises wall means across the tubular core intermediate said opening means at each end of core means.*

*14. A dialyzer comprising housing means (10, 11), a first set of ports including inflow port means (14) for blood in said housing means and outflow port means (15) for blood in said housing means, a second set of ports including dialysis liquid inflow port means (12) in said housing means and dialysis outflow port means (13) in said housing means, tubular core means (4) in said housing means to provide an annular space between said housing means and said core means (4), hollow filament means (3, 18) having open filament ends, sealing and bonding means (29, 30) operatively bonding the hollow filament means (3, 18) to one another adjacent said open ends, said hollow filament means occupying said annular space, first flow communication means in said housing means (16, 17) for providing flow communication into and out of said open filament ends and the respective one of said port sets arranged at each end of said hollow filament means, interstices extending between said hollow filament means substantially all along said hollow filament means between said bonding means (29, 30), second flow communication means (9) in said core means (4) for providing flow communication between said interstices and said second set of ports, said second flow communication means consisting of first and second passage openings (9) extending radially outwardly through said core means (4) and located only substantially directly adjacent to each of said bonding means (29, 30), and separation means (6) in said core means (4) for closing off said first passage openings (9) from said second passage openings (9) except through said interstices whereby a liquid flowing from said inflow port means to said outflow port means of said second set of ports is forced to flow through said interstices substantially along the entire effective length of said filament means between said first and second passage openings, for optimally using the available interface surface formed by said hollow filament means.*

*15. The dialyzer of claim 14, further comprising jacket means (19) surrounding said hollow filament means and said core means in said housing means.*

* * * * *

UNITED STATES PATENT AND TRADEMARK OFFICE

CERTIFICATE OF CORRECTION

PATENT NO. : Re 31029

DATED : September 14, 1982

INVENTOR(S) : Wilfried Schael

It is certified that error appears in the above-identified patent and that said Letters Patent is hereby corrected as shown below:

On the title page item

[30] Foreign Application Priority Data should read:

--Sep. 24, 1975 [DE] Fed. Rep. of Germany 2542438--.

In the Claims:

Claim 14, column 8, line 26, "in said housing means (16, 17)" should read: --(16, 17) in said housing means--;

Claim 14, column 8, line 35, after "means" insert --(9)--.

Signed and Sealed this

*Twenty-eighth* Day of *December 1982*

[SEAL]

*Attest:*

GERALD J. MOSSINGHOFF

*Attesting Officer*

*Commissioner of Patents and Trademarks*